(12) United States Patent
Mannefred et al.

(10) Patent No.: US 11,126,193 B2
(45) Date of Patent: Sep. 21, 2021

(54) AUTOMATIC BEACON POSITION DETERMINATION

(71) Applicant: HUSQVARNA AB, Huskvarna (SE)

(72) Inventors: Björn Mannefred, Jönköping (SE); Stefan Grufman, Bankeryd (SE); Johan Deimert, Habo (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 15/318,169

(22) PCT Filed: Jun. 19, 2014

(86) PCT No.: PCT/EP2014/062924
§ 371 (c)(1),
(2) Date: Dec. 12, 2016

(87) PCT Pub. No.: WO2015/192902
PCT Pub. Date: Dec. 23, 2015

(65) Prior Publication Data
US 2017/0108872 A1    Apr. 20, 2017

(51) Int. Cl.
*G05D 1/02*    (2020.01)
*G01S 5/02*    (2010.01)
(Continued)

(52) U.S. Cl.
CPC ......... *G05D 1/0234* (2013.01); *A01D 34/008* (2013.01); *A01D 69/02* (2013.01);
(Continued)

(58) Field of Classification Search
None
See application file for complete search history.

(56) References Cited

U.S. PATENT DOCUMENTS 5,491,670 A * 2/1996 Weber ............... G01S 5/30
                                        367/127
5,974,348 A * 10/1999 Rocks .............. G01S 1/7034
                                        701/28

(Continued)

FOREIGN PATENT DOCUMENTS

EP    2515147 A2    10/2012
JP    S6274107 A    4/1987
(Continued)

OTHER PUBLICATIONS

Rod Deakin, '3D Coordinate Transformations', (Year: Jan. 1999).*
(Continued)

*Primary Examiner* — Jonathan M Dager
*Assistant Examiner* — Garrett F Evans
(74) *Attorney, Agent, or Firm* — Burr & Forman LLP

(57) ABSTRACT

A method for robotic discovery and use of beacons for navigation may include performing a beacon position determination process with respect to at least one beacon usable for range determination by a robotic vehicle responsive to initiation of operation of the robotic vehicle. The method may further include determining a position of the at least one beacon based on the position determination process, and employing the position of the at least one beacon as determined for position information determination of the robotic vehicle during continued operation of the robotic vehicle.

17 Claims, 6 Drawing Sheets

(51) Int. Cl.
*G01S 5/14* (2006.01)
*A01D 34/00* (2006.01)
*A01D 69/02* (2006.01)
*A01D 101/00* (2006.01)

(52) U.S. Cl.
CPC .............. *G01S 5/0284* (2013.01); *G01S 5/14* (2013.01); *A01D 2101/00* (2013.01); *G05D 2201/0208* (2013.01)

(56) References Cited

U.S. PATENT DOCUMENTS

| | | | | |
|---|---|---|---|---|
| 7,693,654 | B1* | 4/2010 | Dietsch | G01C 21/20 701/461 |
| 7,739,034 | B2 | 6/2010 | Farwell | |
| 8,027,761 | B1 | 9/2011 | Nelson | |
| 8,301,325 | B2 | 10/2012 | Traster | |
| 8,780,342 | B2* | 7/2014 | DiBernardo | G01S 5/163 356/139 |
| 2009/0138151 | A1 | 5/2009 | Smid et al. | |
| 2010/0023195 | A1 | 1/2010 | Traster | |
| 2010/0305752 | A1* | 12/2010 | Abramson | G01S 1/7034 700/245 |
| 2012/0085820 | A1 | 4/2012 | Morgan | |
| 2012/0173185 | A1* | 7/2012 | Taylor | G01B 11/026 702/104 |
| 2014/0376768 | A1* | 12/2014 | Troy | G01S 17/46 382/103 |
| 2015/0012162 | A1* | 1/2015 | Cobb | G05D 1/0291 701/23 |

FOREIGN PATENT DOCUMENTS

| | | |
|---|---|---|
| JP | 2005063184 A | 3/2005 |
| JP | 2009544966 A | 12/2009 |
| JP | 2013515952 A | 5/2013 |
| WO | 2008013355 A1 | 1/2008 |
| WO | 2011077166 A1 | 6/2011 |

OTHER PUBLICATIONS

Takeshi Sasaki and Kideki Hashimoto, 'Calibration of Laser Range Finders Based on Moving Object Tracking in Intelligent Space' (Year: 2009).*

International Search Report and Written Opinion for International Application No. PCT/EP2014/062924 dated Mar. 12, 2015, all enclosed pages cited.

International Preliminary Report on Patentability for International Application No. PCT/EP2014/062924 dated Dec. 20, 2016, all enclosed pages cited.

Leonard. John J. and Dirrant-Whyte. Hugh F., "Mobile Robot Localization by Tracking Geometric Beacons", IEEE Transactions on Robotics and Automation, vol. 7, No. 3, pp. 376-382 (Jun. 3, 1991).

* cited by examiner

AUTOMATIC BEACON POSITION DETERMINATION

TECHNICAL FIELD

Example embodiments generally relate to robotic devices and, more particularly, relate to a robotic device that is configurable to automatically determine the position of beacons used for location determination.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Robotic mowers are typically capable of transiting over even and uneven terrain to execute yard maintenance activities relating to mowing. The robotic mowers may be programmed to stay within a defined area while performing their mowing tasks, and may even be configured to perform other tasks in the defined area. The defined areas have commonly been designated using boundary wires that are detectable when the robotic mowers encounter the wires at the boundary of the defined area. However, placement of such wires can be difficult, and so alternative structures have been sought to help operators define areas in which robotic mowers can operate, or to help the mowers navigate within such defined areas.

BRIEF SUMMARY OF SOME EXAMPLES

Some example embodiments may provide a robotic vehicle that can automatically determine (as a matter of first impression or for confirmation purposes) the location of beacons that can be used for position determination of the robotic vehicle. Once the location of the beacons has been determined, the robotic vehicle can then navigate relative to the corresponding beacons of known location.

In an example embodiment, a robotic vehicle is provided. The robotic vehicle may include processing circuitry configured for performing a beacon position determination process with respect to at least one beacon usable for range determination by a robotic vehicle responsive to initiation of operation of the robotic vehicle. The processing circuitry may be further configured for determining a position of the at least one beacon based on the position determination process, and employing the position of the at least one beacon as determined for position information determination of the robotic vehicle during continued operation of the robotic vehicle.

In another example embodiment, a method for robotic vehicle discovery and use of beacons for navigation may include performing a beacon position determination process with respect to at least one beacon usable for range determination by a robotic vehicle responsive to initiation of operation of the robotic vehicle. The method may further include determining a position of the at least one beacon based on the position determination process, and employing the position of the at least one beacon as determined for position information determination of the robotic vehicle during continued operation of the robotic vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
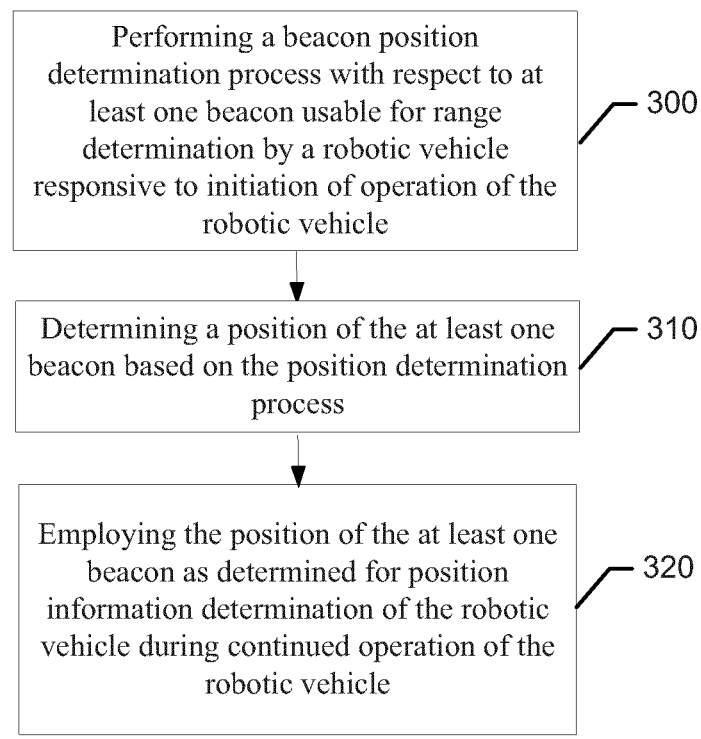
Figure 6:
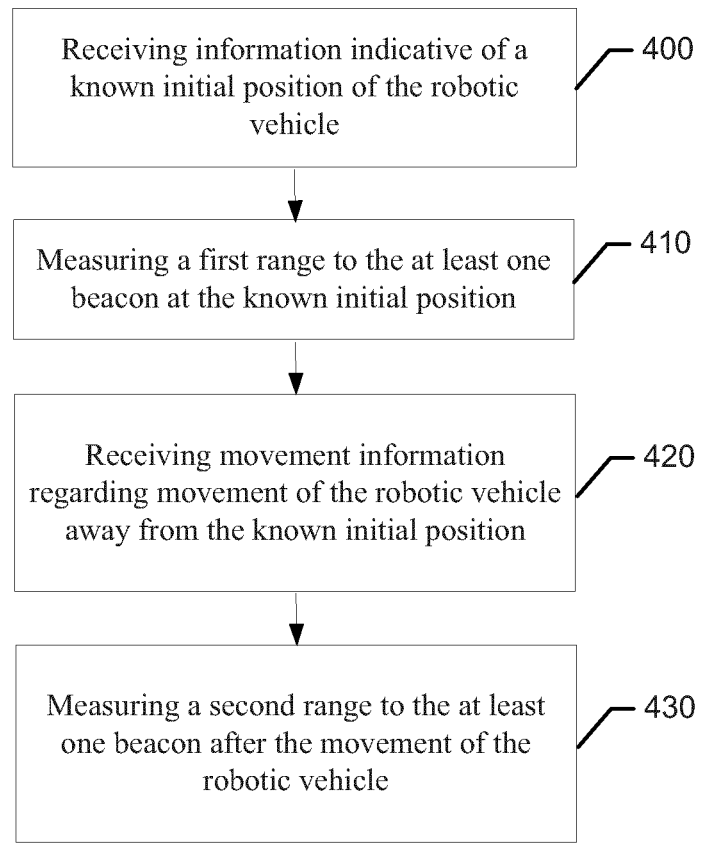

FIG. 4, which includes FIGS. 4A, 4B, 4C and 4D, illustrates various example position determination scenarios in accordance with an example embodiment;

FIG. 5 illustrates a block diagram of a method in accordance with an example embodiment; and FIG. 6 illustrates a block diagram of a method according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "garden" is meant to relate to any yard, parcel, grounds, or other property that is maintained and/or monitored using equipment. As such, the term garden could refer to an area in which various varieties of vegetation could be cultivated including, for example, grasses, trees, bushes, shrubs, flowers, vegetables, fruits, herbs and/or the like. As used herein, operable coupling should be understood to relate to direct or indirect connection that, in either case, enables functional interconnection of components that are operably coupled to each other.

In an example embodiment, a robotic vehicle (e.g., a robotic mower, mobile sensing device, watering device and/or the like) is provided with a beacon position estimator that is configured to employ a known starting location for the robotic vehicle and known movement information from the known starting location along with range information from beacon(s) initially of unknown location to determine the position of the beacon(s). Thereafter, the navigation of the robotic vehicle may be accomplished using the determined positions of the beacons as a reference.

Figure 1:
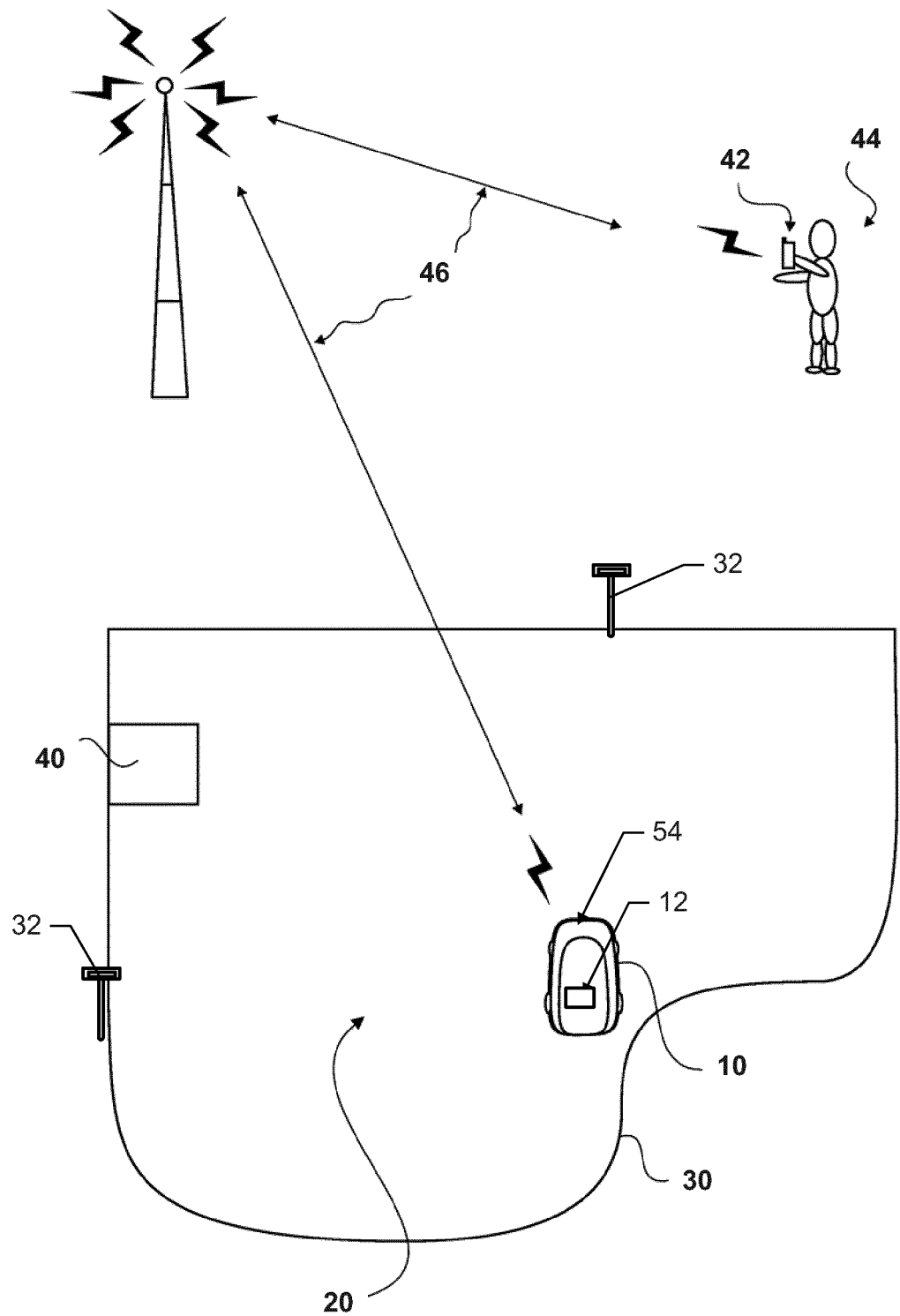
FIG. 1 illustrates an example operating environment for a robotic mower that may employ an example embodiment.

FIG. 1 illustrates an example operating environment for a robotic mower 10 that may employ an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is marked by a boundary wire, the boundary wire may emit electrical signals that are detectable by the robotic mower 10 to inform the robotic mower 10 when the boundary 30 of the parcel 20 has been reached. In some cases, one or more beacons 32 may be provided to emit signals (e.g., RF signals) that can be used to determine range between the beacons 32 and the robotic mower 10. The ranging information can be used by the robotic mower 10 to determine its relative position on the parcel 20.

The robotic mower 10 may be controlled, at least in part, via control circuitry 12 located onboard. The control circuitry 12 may include, among other things, a positioning module and a beacon position estimator, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the beacon position estimator may determine (i.e., discover or confirm) the location of the beacons 32 so that they can be used by the positioning module for navigation of the robotic mower 10 while the parcel 20 is traversed.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via a wireless communication network 46. However, the wireless network 46 and other remote devices may not be employed in some embodiments. For example, the charge station 40 may have a wired connection to a computer of the remote operator 44. In embodiments where the wireless network 46 is employed, the wireless network 46 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless network 46 and the devices or databases (e.g., servers, electronic device 42, control circuitry 12) may be accomplished by either wireline or wireless communication mechanisms and corresponding protocols.

Figure 2B:
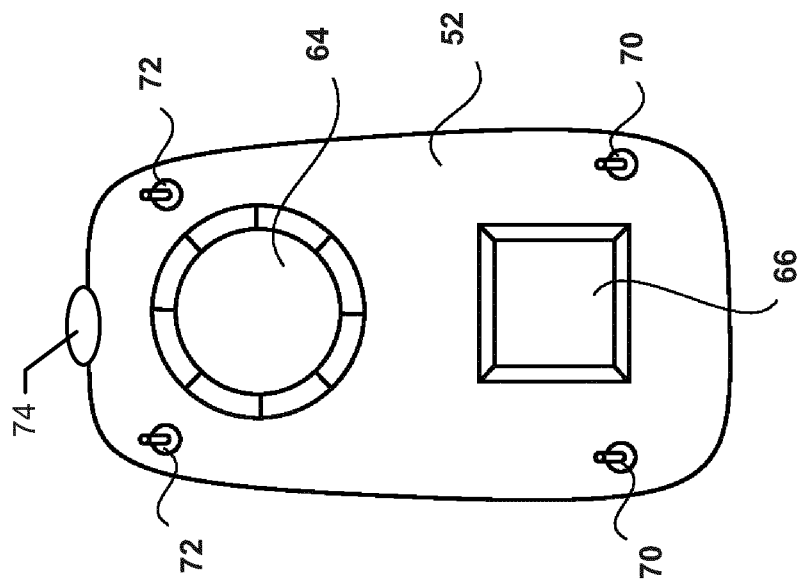
FIG. 2B illustrates a schematic view of an inner housing and various other components of the robotic mower according to an example embodiment.
Figure 2A:
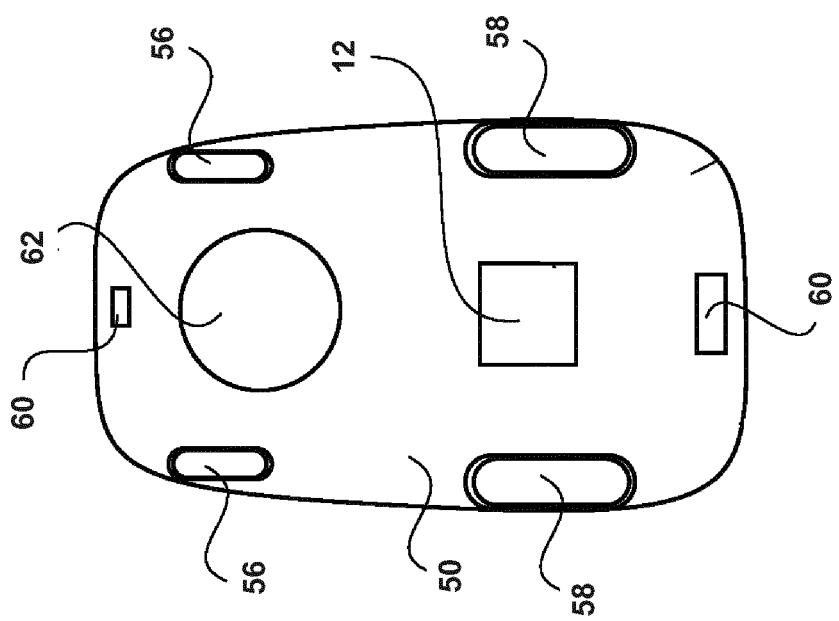
FIG. 2A illustrates a schematic view of a base plate and various components of the robotic mower according to an example embodiment.

FIG. 2, which includes FIGS. 2A and 2B, illustrates some of the parts that may be employed in connection with an example of the robotic mower 10. However, it should be appreciated that example embodiments may be employed on numerous other vehicles that may employ different designs. As such, components described may be excluded in some embodiments and/or additional components may be provided. Moreover, the locations of some components may be moved in some embodiments. FIG. 2A illustrates a schematic view of a base plate and various components of the robotic mower according to an example embodiment and FIG. 2B illustrates a schematic view of an inner housing and various other components of the robotic mower according to an example embodiment.

Referring to FIGS. 1 and 2, the robotic mower 10 of one example embodiment may include a base plate 50, an inner housing 52 and an outer housing 54. The inner housing 52 may be configured to be arranged on top of a base plate 50 and the outer housing 54 may be configured to be arranged on top of the inner housing 52. The base plate 50 may form a support structure from which one or more front wheels 56 and one or more rear wheels 58 may be supported. In some embodiments, the one or more rear wheels 58 may be relatively large as compared to the one or more front wheels 56. Moreover, the one or more rear wheels 58 may be configured to operate either in a forward or backward direction, but may otherwise not be steerable. However, the one or more front wheels 56 may be steerable responsive to control by the control circuitry 12. Alternatively, the front wheels 56 may be swivel wheels capable of following any direction as required by the control of the rear wheels 58.

In an example embodiment, the base plate 50 may further include one or more sensors 60 that may be used to detect the boundary 30 and/or objects that may form part of the boundary of the parcel. The sensors 60 may also detect various parameters, conditions, objects and/or the like that may be encountered during operation of the robotic mower 10 within the boundary 30 of the parcel 20. In relation to object detection, the objects may be fixed or temporary (e.g., movable) objects. In some cases, the sensors 60 may include a front sensor and a rear sensor. However, it should be appreciated that any number of sensors may be employed and they may be disposed at any desirable location on the robotic mower 10. The sensors 60 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 60 may be used, at least in part, for determining the location of the robotic mower 10 relative to boundaries or other points of interest (e.g., a starting point or other key features) of the parcel 20, or determining a position history or track of the robotic mower 10 over time.

The base plate 50 may further support a cutting motor 62 configured to drive a cutting blade or other cutters of the robotic mower 10. In some embodiments, the outer housing 54 and the inner housing 52 may be plastic, light metal, or other similarly lightweight components. The inner housing 52 may include a cover 64 for the cutting motor 62. In some embodiments, a user interface (e.g., display 66) may be provided on the inner housing 3. The user interface may be employed to interface with the control circuitry 12 for controlling operations of the robotic mower 10.

In some embodiments, the sensors 60 may include sensors specifically provided for detecting objects (other than the boundary 30 or objects forming boundaries of the parcel 20) and/or sensors for detecting lifting (or tipping beyond a threshold amount) of the robotic mower 10. Alternatively, separate sensors (e.g., collision sensors 70 and lifting sensors 72) may be provided for each function, and those sensors may be capable of communicating with the control circuitry 12 in addition to the sensors 60.

Figure 3:
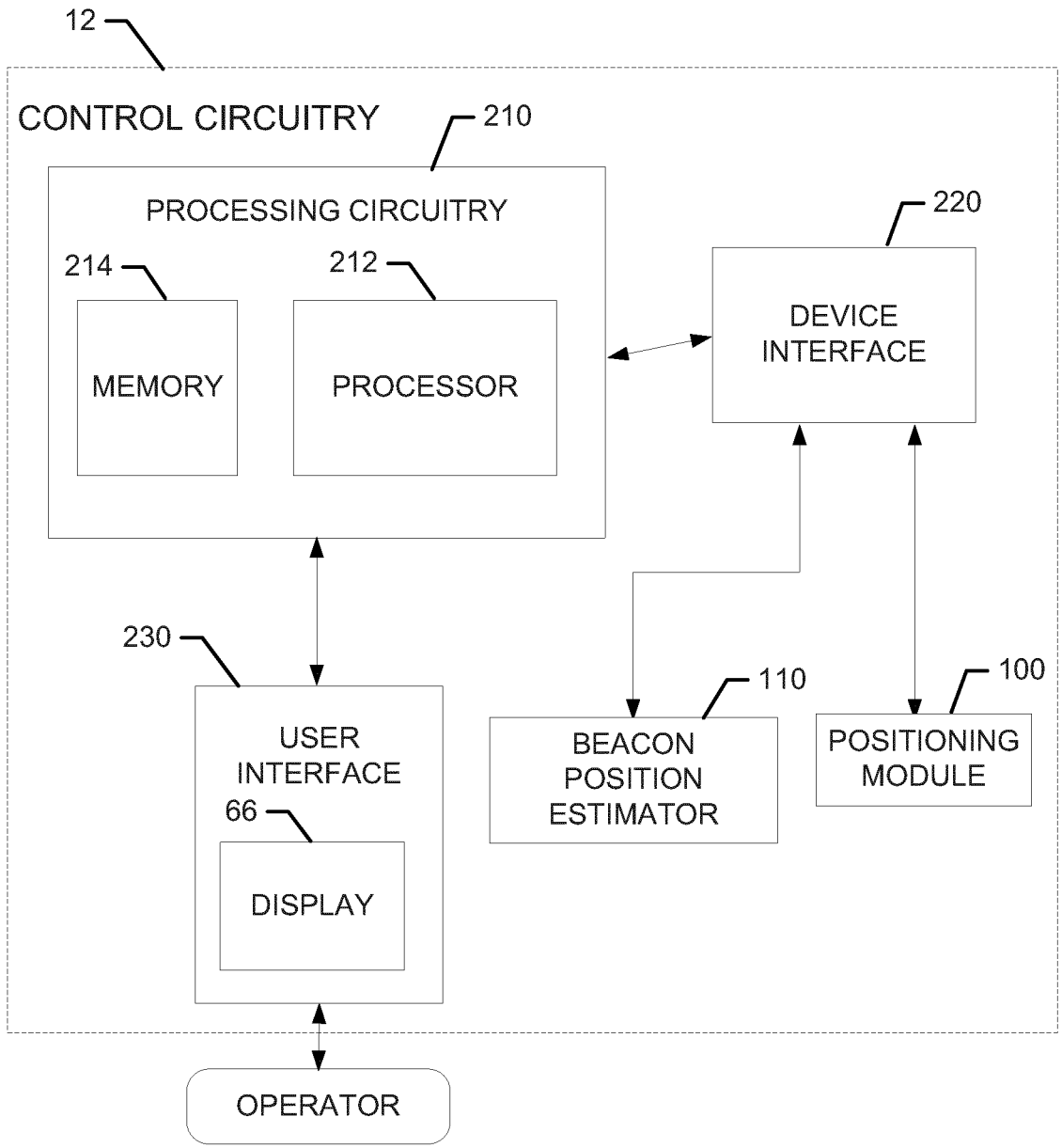
FIG. 3 illustrates a block diagram of various components of processing circuitry of the robotic mower to illustrate some of the components that enable the functional performance of the robotic mower and to facilitate description of an example embodiment.

FIG. 3 illustrates a block diagram of various components of the control circuitry 12 to illustrate some of the components that enable the functional performance of the robotic mower 10 and to facilitate description of an example embodiment. In some example embodiments, the control circuitry 12 may include or otherwise be in communication with positioning module 100 and beacon position estimator 110 disposed at the robotic mower 10. As such, for example, the functions attributable to the positioning module 100 and/or the beacon position estimator 110 may be carried out by the control circuitry 12.

The control circuitry 12 may include processing circuitry 210 that may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230 (e.g., display 66). As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of the robotic mower 10 via a single data bus. As such, the data bus may connect to a plurality or all of the switching components and/or other electrically controlled components of the robotic mower 10.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the positioning module 100 and the beacon position estimator 110. As such, in some embodiments, the processor 212 (or the processing circuitry 210) may be said to cause each of the operations described in connection with the positioning module 100 and the beacon position estimator 110 by directing the positioning module 100 and the beacon position estimator 110, respectively, to undertake the corresponding functionalities responsive to execution of instructions or algorithms configuring the processor 212 (or processing circuitry 210) accordingly.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 100 and/or the beacon position estimator 110 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from various sensors or components of the robotic mower 10. Among the contents of the memory 214, applications may be stored for execution by the processor 212 in order to carry out the functionality associated with each respective application. In some cases, the applications may include an algorithm for determining movement of the robotic mower 10 from a known location (e.g., the location of the charge station 40) and corresponding changes to range from one or more beacons 32. The application may enable the estimation or determination of the location of the beacons 32 and thereafter, the beacons 32 may be used to enhance or otherwise facilitate navigation of the robotic mower 10. The applications and/or algorithms may therefore include instructions for performing the functionality described herein when executed.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., display 66), one or more buttons or keys (e.g., function buttons), and/or other input/output mechanisms (e.g., microphone, speakers, cursor, joystick, lights and/or the like).

The device interface 220 may include one or more interface mechanisms for enabling communication with other devices either locally or remotely. In some cases, the device interface 220 may be any means such as a device or circuitry embodied in either hardware, or a combination of hardware and software that is configured to receive and/or transmit data from/to sensors or other components in communication with the processing circuitry 210. In some example embodiments, the device interface 220 may provide interfaces for communication of data from the positioning module 100 and/or the beacon position estimator 110 via wired or wireless communication interfaces in a real-time manner, as a data package downloaded after data gathering or in one or more burst transmission of any kind.

The positioning module 100 may be configured to utilize one or more sensors to determine a location of the robotic mower 10 and direct continued motion of the robotic mower 10 to achieve appropriate coverage of the parcel 20. As such, the robotic mower 100 (or more specifically, the control circuitry 12) may use the location information to determine a mower track and provide full coverage of the parcel 20 to ensure the entire parcel is mowed. The positioning module 100 may therefore be configured to direct movement of the robotic mower 10, including the speed and/or direction of the robotic mower 10. Various sensors of the robotic mower 10 may be included as a portion of, or otherwise communicate with, the positioning module 100 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 100.

The positioning module 100 may also include circuitry and components for detecting transmissions from the beacons 32 to determine range to the beacons 32. The ranging information may be used to facilitate navigation of the robotic mower 10 on the parcel 20 as long as beacon position is known. For example, the determined range from a beacon may be used with corresponding determined ranges from other beacons to triangulate an estimated position of the robotic mower 10 based on the intersection of the range arcs from the beacons. Using repeated estimates of robotic mower 10 positions, the positioning module 100 may generally know a current location of the robotic mower 10 and past locations as well in order to direct future operation of the robotic mower 10 to achieve full coverage of the parcel 20 (or at least defined work areas thereof). In some cases, the positioning module 100 may be configured to avoid use of the ranging information from beacons 32 for navigational purposes until beacon location is determined or confirmed using the techniques described herein. As such, for example, inertial navigation may initially be used in reference to a known location (e.g., the charge station 40 location) until an estimated beacon position is determined or confirmed.

The beacon position estimator 110 may be configured to perform ranging measurements relative to the beacons 32 assuming, at least initially, that the beacons 32 are at an unknown location. The beacon position estimator 110 may therefore determine an initial range to the beacons 32 (or even a single beacon in some cases). The beacon position estimator 110 may then receive information (e.g., from the positioning module 100) indicative of a distance and angle of movement of the robotic mower 10. This movement may be registered using odometrics and/or inertial navigation techniques. Another ranging measurement may then be made relative to the beacons 32 such that, in combination with the known start location and movement therefrom, the change in range to the beacons 32 may be used to estimate a location or absolute position of each of the beacons 32. Once the positions of the beacons 32 are determined (or estimated), the determined positions may be used to estimate the position of the robotic mower 10 (e.g., via operation of the positioning module 100) while the robotic mower 10 continues its operation.

In an example embodiment, the beacon position estimator 110 may be configured to operate each time the robotic mower 10 is started or each time the robotic mower 10 leaves the charge station 40. Thus, beacon position may be moved at any time and the robotic mower 10 may be enabled to discover the movement and estimate a knew position of the beacons 32 so that, regardless of any beacon re-positioning, the position of the beacons 32 may be determined and the beacons 32 can be used for navigation of the robotic mower 10. As such, the robotic mower 10 may, for example, have a beacon location determination (or confirmation) sequence that initiates as a first operational stage prior to shifting into a navigational stage during which the beacons 32 are used as navigational aids based on the determined positions of the beacons 32 in the beacon location determination sequence.

The process described above can be employed relative to one or more beacons 32. When multiple beacons 32 are used, the distance in between each beacon can also be used in the estimation of beacon positions. As such, the beacon position estimator 110 may be configured to determine the distance between beacons as well. Using multiple beacons and determining the distance between such beacons, it may also be possible to detect if a beacon is moved during operation and movement of the robotic mower 10.

Figure 4C:
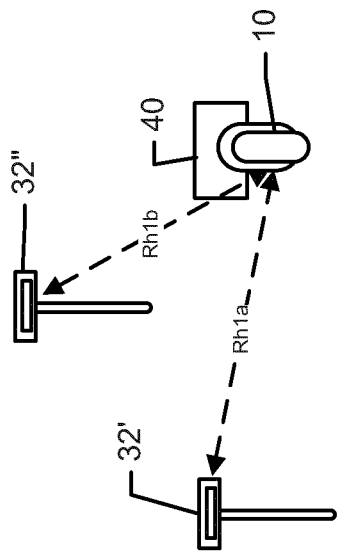
Figure 4D:
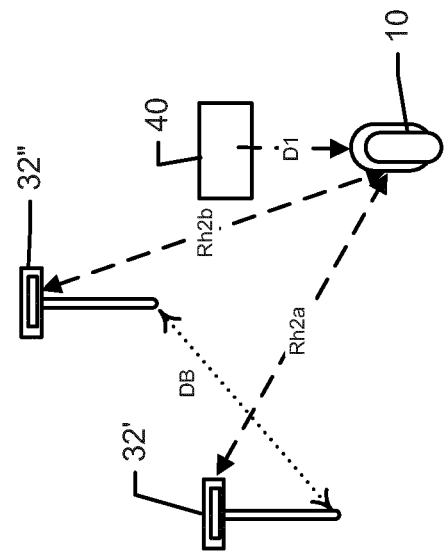
Figure 4A:
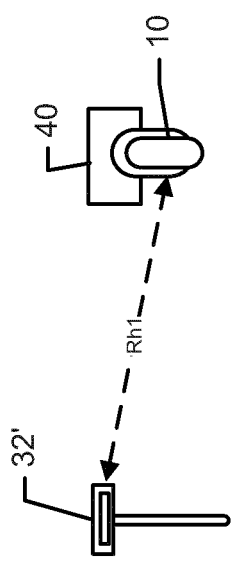
Figure 4B:
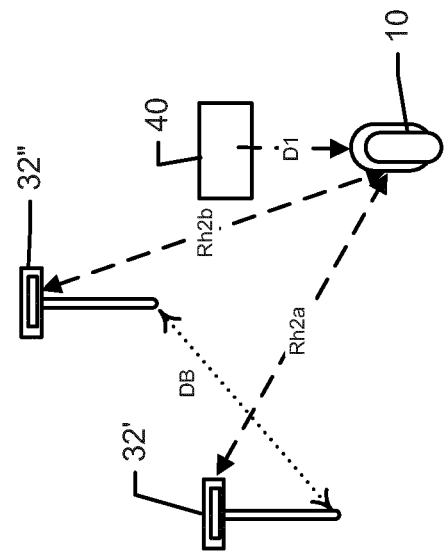

FIG. 4, which includes FIGS. 4A, 4B, 4C and 4D, illustrates various example position determination scenarios. In this regard, FIG. 4A shows the robotic mower 10 at a known initial location (i.e., at the charge station 40), which may represent an initial grid location (e.g., 0, 0). An initial range measurement (Rh1) may be made relative to a single beacon 32'. Thereafter, the robotic mower 10 may move a measureable distance (D1) at a known angle (e.g., to grid location 0, 1—having moved one meter along the Y-axis of the grid) as shown in FIG. 4B. A new range measurement (Rh2) may now be made and the beacon position estimator 110 may use the two range measurements and the known positions of the robotic mower 10 when the range measurements were made to estimate the location of the single beacon 32'.

In FIG. 4C, the robotic mower 10 starts again at the known initial location (i.e., at the charge station 40), which may again represent the initial grid location (e.g., 0, 0). An initial range measurement (Rh1$a$ and Rh1$b$) may be made relative to a first beacon 32' and a second beacon 32". Thereafter, the robotic mower 10 may move a measureable distance (D1) at a known angle (e.g., to grid location 0, 1—having moved one meter along the Y-axis of the grid) as shown in FIG. 4D. A new range measurement (Rh2$a$ and Rh2$b$) may now be made to the first beacon 32' and the second beacon 32" and the beacon position estimator 110 may use the two range measurements to each beacon and the known positions of the robotic mower 10 when the range measurements were made to estimate the location of the single beacon 32'. As shown in FIG. 4D, the distance between beacons (DB) may also be estimated. In some embodiments, particularly when there are more than two beacons 32, the beacons may determine ranges to each other and their geometry can be uniquely defined without any need for the robotic mower 10 to move at all. Thus, for example, the beacons 32 may determine ranges therebetween and the geometry of the beacons (and therefore beacon position) may be determined and uploaded to the robotic mower 10 either wirelessly or during docking at the charge station 40. During further movement of the robotic mower 10 throughout operation, any indications that the estimated positions of the beacons 32 should be updated may be acted upon so that more accurate beacon positions may be used thereafter. In some cases, turns rather than a straight movement of the robotic mower 10 may also give useful information for position estimation.

Based on the description above, it should be appreciated that the robotic mower 10 may be enabled to confirm that beacon positions are the same as previously known, or otherwise estimate beacon position in relatively short order (i.e., after just a few meters of movement with or without turns). The operator may therefore be enabled to move beacon positions at will and not be concerned about having to conduct a complicated setup procedure to enable the robotic mower 10 to use the beacons for position determination. Indeed, the robotic mower 10 can conduct beacon position estimation on-the-fly, in real-time and without significant external input. With a known initial position, and a known (or knowable) movement of the robotic mower 10, the robotic mower 10 (via the beacon position estimator 110) may determine beacon positions prior to thereafter employing the same beacons for position estimation to navigate the robotic mower 10.

Embodiments of the present invention may therefore be practiced using an apparatus such as the one depicted in FIG. 3. However, other embodiments may be practiced in connection with a computer program product for performing embodiments of the present invention. As such, for example, each block or step of the flowcharts of FIGS. 5 and 6, and combinations of blocks in the flowcharts, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214) and executed by processing circuitry (e.g., processor 212).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 5 and 6. Moreover, other methods derived from the descriptions provided herein may also be performed responsive to execution of steps associated with such methods by a computer programmed to be transformed into a machine specifically configured to perform such methods.

In an example embodiment, a method for robotic vehicle discovery and use of beacons for navigation of the robotic mower may include performing a beacon position determination process with respect to at least one beacon usable for range determination by a robotic vehicle responsive to initiation of operation of the robotic vehicle at operation 300. The method may further include determining a position of the at least one beacon based on the position determination process at operation 310, and employing the position of the at least one beacon as determined for position information determination of the robotic vehicle during continued operation of the robotic vehicle at operation 320.

In some embodiments, operation 300 may further include sub-operations that are illustrated by way of example in FIG. 6 to show how the beacon position determination process may be performed in accordance with an example embodiment. As shown in FIG. 6, operation 300 may include sub-operations such as receiving information indicative of a known initial position of the robotic vehicle at operation 400, and measuring a first range to the at least one beacon at the known initial position at operation 410. The beacon position determination process may further include receiving movement information regarding movement of the robotic vehicle away from the known initial position at operation 420 and measuring a second range to the at least one beacon after the movement of the robotic vehicle at operation 430. As may be appreciated, the operations of FIG. 6 may be duplicated for any number of beacons.

The operations 300-320 and 400 to 430 may also be modified, augmented or amplified in some cases. For example, in some embodiments, (1) determining the position may include estimating the position of the at least one beacon based on a combination of a change between the first and second range values and the movement information. In some embodiments, (2) the known initial position is a location of the charge station. In some cases, (3) a location of the charge station and the movement information are determined relative to a grid system defining a parcel over which the robotic vehicle is enabled to transit. In an example embodiment, (4) the movement information may include a distance moved and an angle of the movement relative to the charge station.

In some cases, any or all of (1) to (4) may be employed and method may be modified such that the at least one beacon is actually a plurality of beacons, and the beacon position determination process includes determining a range between at least two of the beacons among the plurality of beacons. Additionally or alternatively, determining the position of the at least one beacon further includes determining the position responsive to movement of the beacon during operation of the robotic vehicle. In an example embodiment, performing a beacon position determination process may include conducting range determination between more than two beacons to determine geometric information descriptive of beacon relative positions. In such an example, determining the position of the at least one beacon based on the position determination process may include utilizing the geometric information, without movement of the robotic vehicle, to determine the position of the more than two beacons.

In an example embodiment, an apparatus for performing the methods of FIGS. 5 and 6 above may comprise processing circuitry (e.g., processing circuitry 210) that may include a processor (e.g., processor 212) configured to perform some or each of the operations (300-320) and (400-430) described above. The processing circuitry 210 may, for example, be configured to perform the operations (300-320) and (400-430) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (300-320) and (400-430) may comprise, for example, the control circuitry 12 or the processing circuitry 210. Additionally or alternatively, at least by virtue of the fact that the processor 212 may be configured to control or even be embodied as the control circuitry 12, the processor 212 and/or a device or circuitry for executing instructions or executing an algorithm for processing information as described above may also form example means for performing operations (300-320) and (400-430).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
    initiating operation of a robotic vehicle to perform a beacon position determination process with respect to at least one RF-emitting beacon of an initially unknown location usable for range determination by the robotic vehicle, wherein the robotic vehicle is located separately from the at least one RF-emitting beacon and the robotic vehicle receives at least one RF signal from the at least one RF-emitting beacon to perform the beacon position determination process;
    determining a position of the at least one RF-emitting beacon based on the position determination process, wherein the robotic vehicle determines the position of the at least one RF-emitting beacon based on the position determination process; and
    employing the position of the at least one RF-emitting beacon as determined for position information determination of the robotic vehicle during continued operation of the robotic vehicle by receiving RF signals from the at least one RF-emitting beacon;
    wherein performing the beacon position determination process comprises (i) receiving information indicative of a known initial position of the robotic vehicle; (ii) measuring a first range between the at least one beacon and the known initial position; (iii) receiving movement information regarding movement of the robotic vehicle away from the known initial position to a second position; and (iv) measuring a second range between the at least one beacon and the second position after the movement of the robotic vehicle, and
    wherein determining the position of the at least one RF-emitting beacon comprises estimating the position of the at least one RF-emitting beacon based on a combination of a change between the first and second range values and the movement information.

2. The method of claim 1, wherein the known initial position is a location of a charge station for charging the robotic vehicle.

3. The method of claim 2, wherein a location of the charge station and the movement information are determined relative to a grid system defining a parcel over which the robotic vehicle is enabled to transit.

4. The method of claim 2, wherein the movement information comprises a distance moved and an angle of the movement relative to the charge station.

5. The method of claim 1, wherein the at least one RF-emitting beacon comprises a plurality of beacons, and wherein the beacon position determination process comprises determining a range between at least two of the plurality of beacons.

6. The method of claim 1, wherein determining the position of the at least one RF-emitting beacon further comprises determining the position responsive to movement of the RF-emitting beacon during operation of the robotic vehicle.

7. The method of claim 1, wherein performing the beacon position determination process comprises conducting range determination between more than two RF-emitting beacons to determine geometric information descriptive of RF-emitting beacon relative positions, and wherein determining the position of the at least one RF-emitting beacon based on the position determination process comprises utilizing the geometric information, without movement of the robotic vehicle, to determine the position of the more than two RF-emitting beacons.

8. A robotic vehicle comprising processing circuitry configured for:
    performing a beacon position determination process with respect to at least one RF-emitting beacon of an initially unknown location usable for range determination by a robotic vehicle responsive to initiation of operation of the robotic vehicle, wherein the robotic vehicle is located separately from the at least one RF-emitting beacon and the robotic vehicle receives at least one RF signal from the at least one RF-emitting beacon to perform the beacon position determination process;
    determining a position of the at least one RF-emitting beacon based on the position determination process; and
    employing the position of the at least one RF-emitting beacon as determined for position information determination of the robotic vehicle during continued operation of the robotic vehicle by receiving RF signals from the at least one RF-emitting beacon;

wherein performing the beacon position determination process comprises (i) receiving information indicative of a known initial position of the robotic vehicle; (ii) measuring a first range between the at least one beacon and the known initial position; (iii) receiving movement information regarding movement of the robotic vehicle away from the known initial position to a second position; and (iv) measuring a second range between the at least one beacon and the second position after the movement of the robotic vehicle, and wherein determining the position of the at least one RF-emitting beacon comprises estimating the position of the at least one RF-emitting beacon based on a combination of a change between the first and second range values and the movement information.

9. The robotic vehicle of claim 8, wherein the known initial position is a location of a charge station for charging the robotic vehicle.

10. The robotic vehicle of claim 9, wherein a location of the charge station and the movement information are determined relative to a grid system defining a parcel over which the robotic vehicle is enabled to transit.

11. The robotic vehicle of claim 10, wherein the movement information comprises a distance moved and an angle of the movement relative to the charge station.

12. The robotic vehicle of claim 8, wherein the at least one RF-emitting beacon comprises a plurality of beacons, and wherein the beacon position determination process comprises determining a range between at least two of the plurality of beacons.

13. The robotic vehicle of claim 8, wherein determining the position of the at least one RF-emitting beacon further comprises determining the position responsive to movement of the RF-emitting beacon during operation of the robotic vehicle.

14. The robotic vehicle of claim 8, wherein performing the beacon position determination process comprises conducting range determination between more than two RF-emitting beacons to determine geometric information descriptive of RF-emitting beacon relative positions, and wherein determining the position of the at least one RF-emitting beacon based on the position determination process comprises utilizing the geometric information, without movement of the robotic vehicle, to determine the position of the more than two RF-emitting beacons.

15. The method of claim 1, wherein the robotic vehicle is a robotic mower or a watering device.

16. A method comprising:

initiating operation of a robotic vehicle to perform a beacon position determination process with respect to at least one beacon of an initially unknown location usable for range determination by the robotic vehicle, wherein the robotic vehicle is located separately from the at least one beacon and the robotic vehicle receives at least one ultrasonic signal from the at least one beacon to perform the beacon position determination process;

determining a position of the at least one beacon based on the position determination process, wherein the robotic vehicle determines the position of the at least one beacon based on the position determination process; and employing the position of the at least one beacon as determined for position information determination of the robotic vehicle during continued operation of the robotic vehicle by receiving ultrasonic signals from the at least one beacon;

wherein performing the beacon position determination process comprises (i) receiving information indicative of a known initial position of the robotic vehicle; (ii) measuring a first range between the at least one beacon and the known initial position; (iii) receiving movement information regarding movement of the robotic vehicle away from the known initial position to a second position; and (iv) measuring a second range between the at least one beacon and the second position after the movement of the robotic vehicle, and wherein determining the position of the at least one beacon comprises estimating the position of the at least one beacon based on a combination of a change between the first and second range values and the movement information.

17. The method of claim 1, wherein the at least one RF-emitting beacon includes a first RF-emitting beacon, wherein the robotic vehicle receives at least one RF signal from the first RF-emitting beacon to perform the beacon position determination process; and determining a position of the first RF-emitting beacon based on the position determination process, wherein the robotic vehicle determines the position of the first RF-emitting beacon based on the position determination process.

\* \* \* \* \*